US010845693B2

(12) United States Patent
Frimpong (10) Patent No.: US 10,845,693 B2
(45) Date of Patent: Nov. 24, 2020

(54) VEHICLE INFORMATION DEVICE AND A METHOD OF PROVIDING INFORMATION PERTAINING TO A VEHICLE

(71) Applicant: Dennis Frimpong, Somerset, NJ (US)

(72) Inventor: Dennis Frimpong, Somerset, NJ (US)

(*) Notice: Subject to any disclaimer, the term of this patent is extended or adjusted under 35 U.S.C. 154(b) by 0 days.

(21) Appl. No.: 15/900,446

(22) Filed: Feb. 20, 2018

(65) Prior Publication Data

US 2018/0229643 A1 Aug. 16, 2018

Related U.S. Application Data

(60) Provisional application No. 62/436,566, filed on Dec. 20, 2016.

(51) Int. Cl.
| | | |
|---|---|---|
| *G03B 21/20* | (2006.01) | |
| *B60Q 1/00* | (2006.01) | |
| *G03H 1/00* | (2006.01) | |
| *G03H 1/22* | (2006.01) | |
| *B60Q 1/50* | (2006.01) | |
| *G03B 21/14* | (2006.01) | |
| *G10L 15/26* | (2006.01) | |

(52) U.S. Cl.
CPC .......... *G03B 21/206* (2013.01); *B60Q 1/00* (2013.01); *B60Q 1/50* (2013.01); *G03B 21/14* (2013.01); *G03B 21/2053* (2013.01); *G03H 1/0005* (2013.01); *G03H 1/2249* (2013.01); *G10L 15/26* (2013.01); *B60Q 2400/50* (2013.01); *G03H 1/2294* (2013.01)

(58) Field of Classification Search
CPC .. G03B 21/14; G03B 21/2053; G03B 21/206; H04N 5/74; H04N 9/31; B60Q 1/00; B60Q 2400/50; G03H 1/2294; G10L 15/265
See application file for complete search history.

(56) References Cited

U.S. PATENT DOCUMENTS

| | | | | |
|---|---|---|---|---|
| 6,733,134 B2* | 5/2004 | Bleiner | ................... | B60Q 1/52 353/13 |
| 8,371,202 B2* | 2/2013 | Odhner | ................... | G01S 17/58 89/1.11 |
| 2008/0088797 A1* | 4/2008 | Salacuse | ................ | G03B 21/10 352/104 |
| 2012/0224062 A1* | 9/2012 | Lacoste | ................... | G02B 27/01 348/148 |
| 2013/0243247 A1* | 9/2013 | Sakaue | .................. | G01B 11/25 382/103 |

(Continued)

FOREIGN PATENT DOCUMENTS

| | | | | |
|---|---|---|---|---|
| KR | 20110089979 A | * | 8/2011 | .......... B60Q 1/0076 |
| WO | WO-2016202940 A1 | * | 12/2016 | ............ B60Q 1/302 |

*Primary Examiner* — Michelle M Iacoletti
*Assistant Examiner* — Magda Cruz
(74) *Attorney, Agent, or Firm* — Willie Jacques; Emanus, LLC (57) ABSTRACT

A vehicle information device to be installed into a vehicle, comprises a data acquisition interface, configured to receive data corresponding to the vehicle, the data being received for a plurality of attributes, a control unit configured to receive the data from the data acquisition interface and determine one or more of a previous, a current and a future state of the vehicle from the data and a projector unit configured to display one or more of the previous, the current and the future state of the vehicle, in form of a hologram projected through exterior of the vehicle.

18 Claims, 4 Drawing Sheets

(56) References Cited

U.S. PATENT DOCUMENTS

| | | | |
|---|---|---|---|
| 2014/0065520 A1* | 3/2014 | Tsang | G03H 1/02 |
| | | | 430/2 |
| 2015/0116800 A1* | 4/2015 | Yoshida | G02B 27/0103 |
| | | | 359/9 |
| 2016/0202873 A1* | 7/2016 | Chi | G06F 3/04815 |
| | | | 345/173 |
| 2017/0329329 A1* | 11/2017 | Kamhi | B60W 50/14 |
| 2018/0065541 A1* | 3/2018 | Augusty | G08B 5/36 |
| 2018/0072220 A1* | 3/2018 | Yan | G08G 1/166 |
| 2018/0111554 A1* | 4/2018 | Pearce | G06K 9/00791 |

* cited by examiner

VEHICLE INFORMATION DEVICE AND A METHOD OF PROVIDING INFORMATION PERTAINING TO A VEHICLE

CROSS REFERENCE TO RELATED APPLICATION

The present application claims benefit to Provisional Patent Application Ser. No. 62/436,566 filed on Dec. 20, 2016, the entire disclosure of which is hereby incorporated by reference herein under 35 U.S.C. 119(e).

FIELD OF THE INVENTION

The present invention generally relates to vehicular and driver safety and information devices and in particular to a vehicle information device and a method of providing information pertaining to a vehicle, that allows drivers of other vehicles on road about state of the vehicle having the vehicle information device installed.

BACKGROUND ART

Vehicular and road safety issues have become matters of intense scrutiny in recent times. As automotive technology is developing along with transportation infrastructure, vehicles are able to achieve greater and greater speeds. This has led to ever increasing number of road accidents related casualties. According to Association for Safe International Road Travel, 1.3 million people die in road crashes each year; an average of 3,287 deaths a day. An additional 20-50 million are injured or disabled. More than half of all road traffic death occurs among young adults ages 15-44. Road crashes rank as the ninth leading cause of death and account for 2.2% of all deaths globally. Road crashes are the leading cause of death among young people ages 15-29, and the second leading cause of death worldwide among young people ages 5-14. Each year nearly 400,000 people under 25 die on the roads in the world, on average over 1,000 a day. Over 90% of all road fatalities occur in low and middle-income countries, which have less than half of the vehicles in the world. Road crashes cost $518 billion globally, costing individual countries 1-2% of their annual GDP. Road crashes cost low and middle-income countries $65 billion annually, exceeding the total amount received in developmental assistance. Unless action is taken, road traffic injuries are predicted to become the fifth leading cause of death by 2030.

One way of reducing casualties in vehicular or road accidents is through implementation of safety systems. Some of the known safety systems include Anti-Lock Braking System (ABS), Airbags, Electronic Brake Distribution (EBD) and crumple zones etc. Most of these systems come into play during or just after an event or a near-event of collision. To minimize any circumstances of collision or a near-miss, other drivers on the road should be aware of a present or an immediate future state of the vehicle. Conventionally, such an objective is achieved through tail-lamps, blinkers and brake lights etc. However, the tail lamps and blinkers etc. are only indicative means and are not capable of giving an entire picture of the state of the vehicle. Further, such lamps and lights are not always discernible in bright daylight conditions, or if a large distance is involved between two vehicles, or even if one of the vehicles is going at a very high speed.

In light of the discussion above, there is need for a vehicle information device and a method of providing information pertaining to a vehicle that does not suffer from above mentioned deficiencies.

Any discussion of the background art throughout the specification should in no way be considered as an admission that such background art is prior art nor that such background art is widely known or forms part of the common general knowledge in the field.

SUMMARY OF THE INVENTION

According to a first aspect of the present invention, there is provided a vehicle information device to be installed into a vehicle, the vehicle information device comprising a data acquisition interface, configured to receive data corresponding to the vehicle, the data being received for a plurality of attributes, a control unit configured to receive the data from the data acquisition interface and determine one or more of a previous, a current and a future state of the vehicle from the data and a projector unit configured to display one or more of the previous, the current and the future state of the vehicle, in form of a hologram projected through exterior of the vehicle.

In one embodiment of the invention, the plurality of attributes includes a location, a speed, a direction and a destination of the vehicle.

In one embodiment of the invention, the data acquisition interface is configured to receive the location and the destination of the vehicle from a GPS device installed with the vehicle.

In one embodiment of the invention, the data acquisition interface is configured to receive the data from one or more sensing devices installed with the vehicle.

In one embodiment of the invention, the data corresponds to determinations performed over a predetermined period of time.

In one embodiment of the invention, the data corresponds to determinations performed in real-time.

In one embodiment of the invention, the hologram is a 7-Dimensional hologram.

In one embodiment of the invention, the vehicle information device further comprises a microphone configured to receive a voice input, the control unit being configured to convert the voice input into a text output and deliver the text output to a mobile handheld device through a communication network.

In one embodiment of the invention, the vehicle information device further comprises a microphone configured to receive a custom message, the projector unit being configured to include the custom message in the hologram.

In one embodiment of the invention, the projector unit is further configured to include one or more advertisements and/or one or more ornamental patterns in the hologram.

According to a second aspect of the present invention, there is provided a method of providing information pertaining to a vehicle, the method comprising steps of receiving data corresponding to the vehicle, the data being received for a plurality of attributes, determining one or more of a previous, a current and a future state of the vehicle from the data and displaying one or more of the previous, the current and the future state of the vehicle, in form of a hologram projected through exterior of the vehicle.

In one embodiment of the invention, the plurality of attributes includes a location, a speed, a direction and a destination of the vehicle.

In one embodiment of the invention, the location and the destination of the vehicle is received from a GPS device installed with the vehicle.

In one embodiment of the invention, the data is received from one or more sensing devices installed with the vehicle.

In one embodiment of the invention, the data corresponds to determinations performed over a predetermined period of time.

In one embodiment of the invention, the data corresponds to determinations performed in real-time.

In one embodiment of the invention, the hologram is a 7-Dimensional hologram.

In one embodiment of the invention, the method further comprises steps of receiving a voice input, converting the voice input into a text output and delivering the text output to a mobile handheld device through a communication network.

In one embodiment of the invention, the method further comprises steps of receiving a custom message and including the custom message in the hologram.

In one embodiment of the invention, the method further comprises a step of including one or more advertisements and/or one or more ornamental patterns in the hologram.

As used in this document, the term "vehicle" refers to any man-made form of transportation including: cars, buses, motorbikes, bicycles, tractors, all-terrain vehicles, golf carts, wagons, boats, trains to name but a few.

As used in this document, the term "real time" refers to determinations of the data without intentional delay, given the processing limitations of the hardware involved and the time required to measure the data with a predetermined accuracy.

As used in this document, the term "hologram" refers to an image reproduced from a pattern of interference produced by a split coherent beam of radiation (such as a laser). The pattern of interference in that manner may be generated synthetically through digital technology.

BRIEF DESCRIPTION OF THE DRAWINGS

At least one example of the invention will be described with reference to the accompanying drawings, in which.

It should be noted that the same numeral represents the same or similar elements throughout the drawings.

DETAILED DESCRIPTION OF THE EMBODIMENTS

Throughout this specification, unless the context requires otherwise, the words "comprise", "comprises" and "comprising" will be understood to imply the inclusion of a stated step or element or group of steps or elements but not the exclusion of any other step or element or group of steps or elements.

Any one of the terms: "including" or "which includes" or "that includes" as used herein is also an open term that also means including at least the elements/features that follow the term, but not excluding others.

It is contemplated here that a device be installed in a vehicle that collects data pertaining to the vehicle and uses internal logic to determine previous, present and future state of the vehicle. The future state in certain cases may be definitive, however, in other cases the same may be indicative. Further, the device should be able to display the determined states to other drivers of other vehicles on the road, so that the other drivers can act accordingly, if they need to, in order to maintain safe distance from the vehicle under study and avoid any mishaps. The display of determined states may be such that, the other drivers are able to obtain enough information, that is also easily discernible, without being distracted from a very obvious act of "looking at the road while driving", for too long. Therefore, it is envisaged that the display should be in form of a hologram, and preferably, although not binding, in form of a 7-D hologram.

It is in this regards that the present invention has been elucidated with respect to some exemplary illustrations. However, a skilled artisan will appreciate that the invention is not limited to the illustrations and the description below.

Figure 1A:
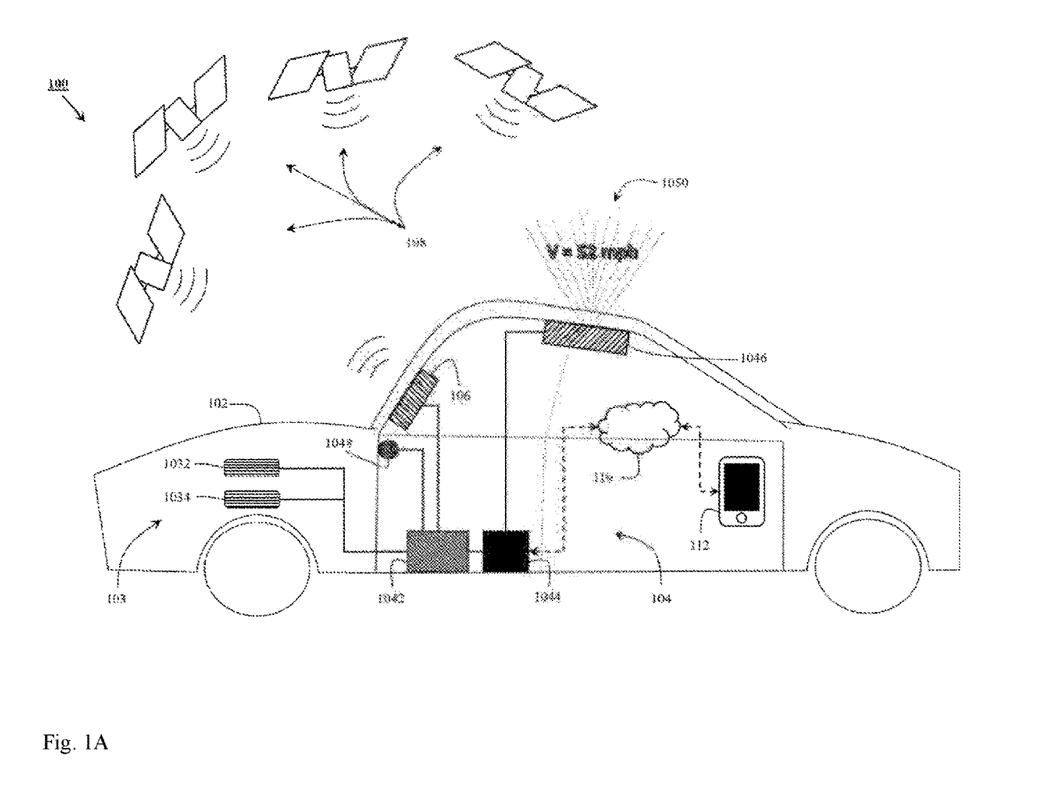
FIG. 1A illustrates a side view of a vehicle with a vehicle information device installed, in accordance with an embodiment of the present invention.

FIG. 1A illustrates a side view 100 of a vehicle 102 with a vehicle information device 104 installed, in accordance with an embodiment of the present invention. The vehicle information device 104 is envisaged to include multiple units that may be installed in a single encasing or the multiple units may be installed at various locations inside the vehicle 102, without undermining packaging concerns. In that manner, respective locations of the multiple units may vary according to type, make, model and variant etc. of the vehicle 102. In any case, the vehicle information device 104 is envisaged to include a data acquisition interface 1042, a control unit 1044 and a projector unit 1046. In several embodiments, the vehicle information device 104 may also include a microphone 1048, purposes of which will be discussed in later discussion. Additional battery packs rechargeable through solar panels may also be included in the vehicle information device 104 to achieve power economy. Moreover, one or more units of the vehicle information device 104 may be provided with weather and ambient resistant outer casings to ensure their longevity.

The data acquisition interface 1042 is configured to receive data corresponding to the vehicle 102, the data being received for a plurality of attributes. In several embodiments, the plurality of attributes may include, but are not limited to, a location, a speed, a direction and a destination of the vehicle 102. For example, the data acquisition interface 1042 may be configured to receive the location and the destination of the vehicle from a GPS device 106 installed with the vehicle 102. The GPS device 106 in that matter may be in communication with a plurality of GPS satellites 108. The destination in this case may be a destination entered by a driver (or some other passenger travelling in the vehicle 102) before start of a trip. The destination in several other embodiments may be a predictive destination determined based several previous trips taken by the vehicle 102 in the past.

The data acquisition device 1042 may also be configured to receive the data from one or more sensing devices 103 installed with the vehicle 102. Exemplary sensing devices 103 may include a velocity/speed sensor 1032 for determining the speed of the vehicle 102 and a gyroscope 1034 for determining the direction of motion of the vehicle 102. There may be several other sensing devices not depicted in FIG. 1A, that may come preinstalled with the vehicle 102 or may be custom installed depending upon specific applications. Further, location of such sensing device 103 may vary according to design of the vehicle 102. For example, speed sensors 1032 may be located at the axle or at an alternator attached to a crankcase. The data so received through the data acquisition interface 1042 is transmitted to the control unit 1044.

The control unit 1044 in envisaged to include a processor and a memory unit for storing instructions that the processor may execute. The processor may be a general-purpose processor, a microcontroller, a Field Programmable Gate Array (FPGA) or an Application Specific Integrated Circuit (ASIC) etc. The memory unit may be a non-volatile memory unit such as EPROM, EEPROM and flash memory etc. There may other supporting circuitry in the control unit 1044, such as amplifiers, rectifiers, Op-Amps, resistors, inductors, diodes and capacitors etc. The control unit 1044 is configured to receive the data from the data acquisition interface 1042 and determine one or more of a previous, a current and a future state of the vehicle 102 from the data. A state in that manner may be an array (or a collection) of values one or more attributes of the plurality of attributes. In other words, in some cases the state may include values of all of the plurality of attributes while in other cases the state may include values of only some of the plurality of attributes. The vehicle 102 in that manner may have a unique state at any given instant of time. For example, if we assume a start of the trip at time (t)=0 min. At, t=20 min., the state S may be defined as equation (1).

$$S=\{l=(lat=40.76, long=-73.99), v=20 \text{ mph}, d=23°N, ds=\text{"Emprire State Building"}\} \qquad (1)$$

Here, "l" denotes location, "v" denotes speed, "d" denoted direction and "ds" denotes destination. Of course, for t=20 min, the values of the plurality of attributes that were there at t=10 min will denote a previous state and the values that would be at t=30 min will denote the future state. In addition, the future state may not always be definitive, but at times may also be predictive or indicative. For example, a future direction of the vehicle 102 may be determined with greater confidence from the destination. However, it may not always be possible to definitively determine the future speed of the vehicle. However, future speed of the vehicle can be predicted, with good amount of confidence, from historical data such as previous driver behavior and present data such as current traffic condition. There may be several other factors that may be incorporated for determining the previous, the present and the future state, without departing from the scope of the present invention.

In certain embodiments or scenarios, the data may correspond to determinations performed in real-time. In other words, the data acquisition interface 1042 is continuously receiving the data for the plurality of attributes. As a result, the control unit 1044 will be able to make quick determinations of the previous, the current and the future state of the vehicle 102. However, it may not always be possible to have real time determinations, such as in scenarios, where battery power needs to be conserved or if there is tracking loss because of loss of connections between the one or more sensing device 103, the GPS device 106 and the data acquisition interface 1042. In such scenarios, the data may correspond to determinations performed over a predetermined period of time (such as after every 2 minutes, or for 2 minutes after every 10 minutes, or data collected over past 1 year, 1 month or 1 week etc.).

Such data may already be stored with the control unit 1044 or may be sampled intermittently in order to save power. It may also happen, for example, that the location is being received from the GPS device 106 in real time, while the speed and the direction are being received from the one or more sensing devices 103 intermittently (or may be not at all, due to loss of connection). Needless to say, the control unit 1044 in such scenarios will be able to deploy interpolation algorithms and predictive models in order to determine the previous, the current and the future state of the vehicle 102. For example, the control unit 1044 may determine speed by dividing distance between two locations with time measured using an internal oscillator. Once such determinations have been made, it is imperative that the other drivers be informed about one or more of the previous, the current and the future state, that being one of the purposes of the vehicle information device 104.

The projector unit 1046 is configured to display one or more of the previous, the current and the future state of the vehicle, in form of a hologram 1050 projected through exterior of the vehicle 102. The hologram 1050 depicts current speed of the vehicle 102. It is envisaged here that the hologram 1050 be a computer generated hologram. Computer generated holograms can be understood from following references, that are included herein, in their entirety.

1. Dallas W. J. (2006) *Computer-Generated Holograms*. In: Poon T C. (eds) *Digital Holography and Three-Dimensional Display*. Springer, Boston, Mass.
2. *Two-channel computer-generated holograms: a simplified method, Optics and Lasers in Engineering*, ISSN: 0143-8166, Vol: 39, Issue: 5, Page: 629-634, Publication Year: 2003.

Figure 1B:
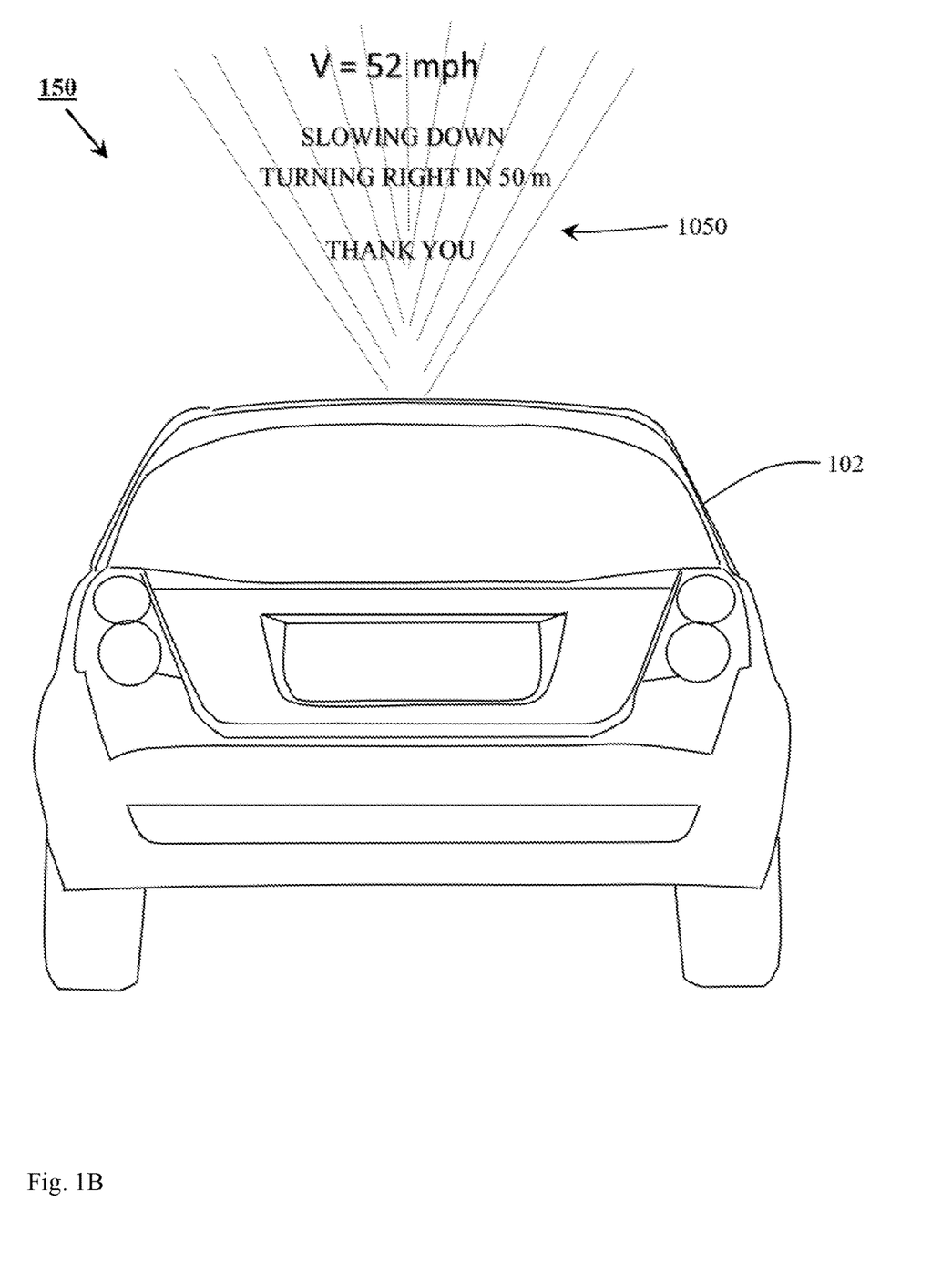
FIG. 1B illustrates a rear view of the vehicle of FIG. 1A, in accordance with an embodiment of the present invention.

It is further envisaged here that, the hologram 1050 is a 7-Dimensional (7D) hologram. A 7D hologram incorporates 3 dimensions of space, 2 dimensional angles, light perception (depth and intensity) and time. FIG. 1B illustrates a rear view of the vehicle 102 of FIG. 1A, in accordance with an embodiment 150 of the present invention. As can be seen from FIG. 1B, the hologram 1050 displays a current speed "52 mph" (current state) and future direction "TURNIN RIGHT IN 50 m" (future state), of the vehicle 102. Additionally, a custom message, such as "THANK YOU", has also been displayed. This information will help the other drivers to slow down as the vehicle 102 slows down and avoid intercepting the vehicle 102, when the vehicle 102 turns right. Since, for ride safety, it is generally recommended to avoid texting or use a mobile/cellular phone in any manner, the microphone 1048 is configured to receive a voice input from the driver and transmit the voice input to the control unit 1044. The voice input may include a message and a name of an intended recipient. The control unit 1044 is in turn configured to convert the voice input into a text output and deliver the text output to a mobile handheld device 112 (such as the cell phone or mobile phone) through a communication network 110. The communication network 110 may be implemented through Bluetooth, 802.x, ZigBee or Radio Frequency etc. The mobile handheld device 112 may then separate out the message from the name of the recipient in the text output and forward the message to the recipient. The microphone 1048 may also be configured to receive the custom message, such as "THANK YOU", for inclusion in the hologram 1050 by the projector unit 1046.

The hologram 1050 may serve a plurality of other commercial purposes too. In one embodiment of the invention, the memory unit of the control unit 1044 may be further configured to store a plurality of advertisements. The plurality of advertisements may be procured from a business entity desiring to promote its products and/or services. The plurality of advertisements in that manner may be loaded into the memory unit through a non-volatile media or may be downloaded from Internet while configuration of the vehicle information device 104. One or more advertisements from the plurality of advertisements may be transmitted from the control unit 1044 to the projector unit 1046 and the projector unit 1046 may be further configured to include the one or more advertisement in the hologram 1050. In several scenarios, the driver or an owner of the vehicle 102 may be incentivized to include the one or more advertisements in the hologram 1050.

Figure 1C:
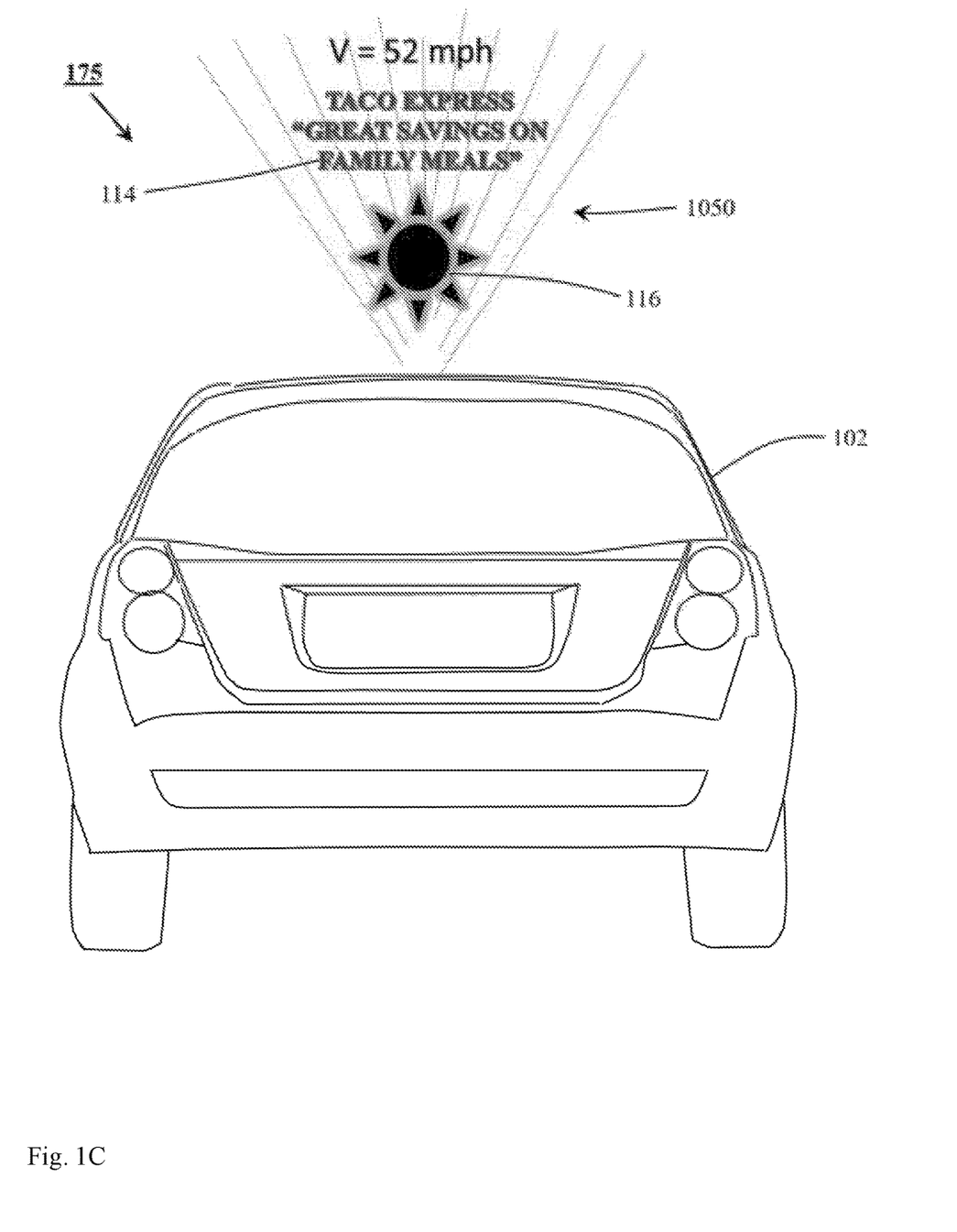
FIG. 1C illustrates a rear view of the vehicle of FIG. 1A, in accordance with another embodiment of the present invention.

The control unit 1044 (and more specifically the memory unit) may also be configured to store a plurality of ornamental patterns (such as artistic designs) to enhance an overall aesthetic appeal of the vehicle 102. The plurality of ornamental patterns may be supplied to the owner of the vehicle 102 on payment of a predefined fee. In several embodiments, the memory unit may come preloaded with some basic ornamental patterns for promotional purposes and the user (or the owner) may have to purchase more advanced ornamental patterns or payment of a fee. Many such business models are possible without departing from the scope of the present invention. In that manner, one or more ornamental patterns, from the plurality of ornamental patterns may be transmitted to the projector unit 1046 and the projector unit 1046 may further be configured to include the one or more ornamental patterns in the hologram 1050. FIG. 1C illustrates a rear view of the vehicle of FIG. 1A, in accordance with another embodiment 175 of the present invention. It can be seen in FIG. 1C that the hologram 1050 includes an advertisement 114 and an ornamental design 116, along with a value of the speed (v=52 mph).

Figure 2:
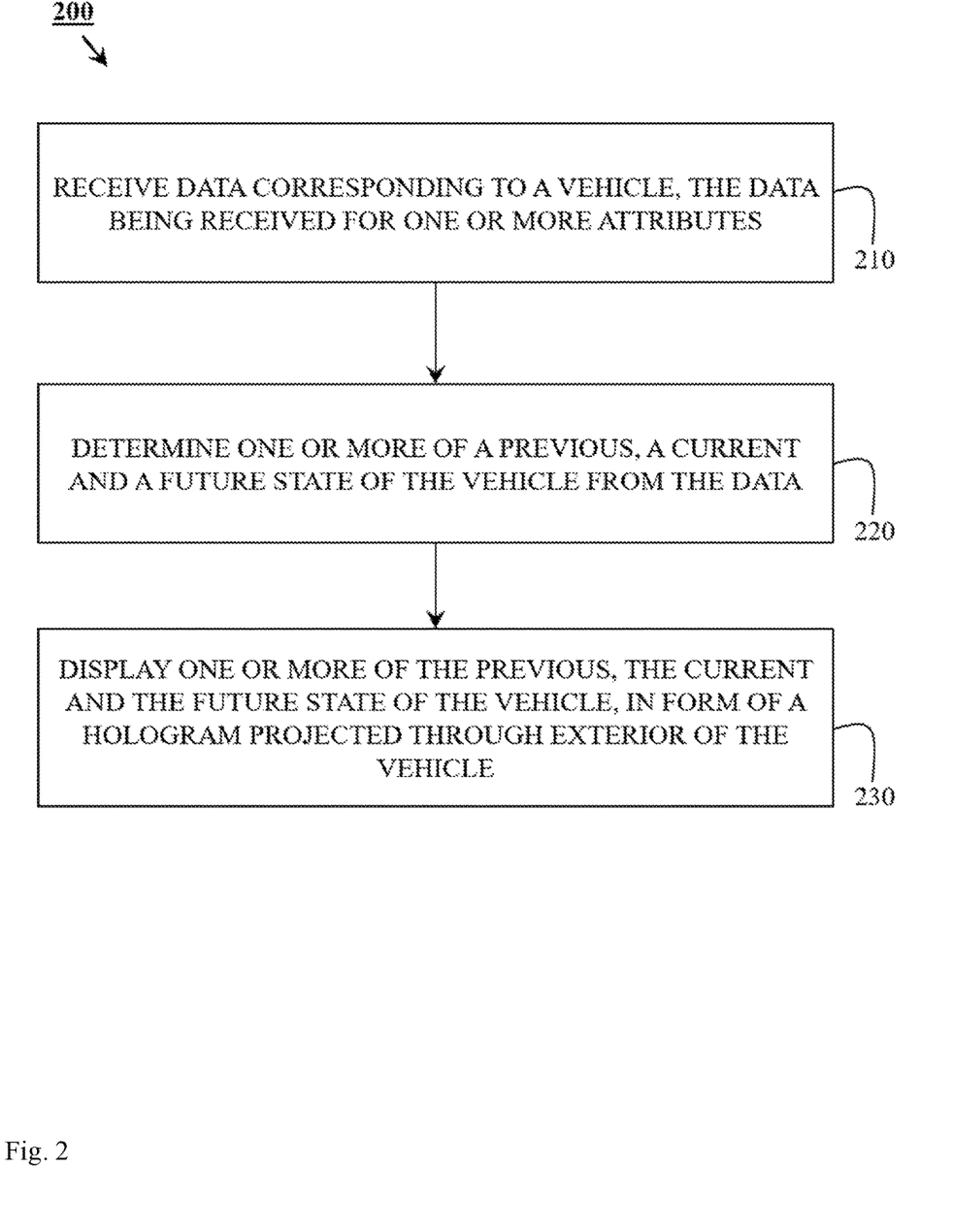
FIG. 2 illustrates a method of providing information pertaining to a vehicle, in accordance with an embodiment of the present invention.

FIG. 2 illustrates a method 200 of providing information pertaining to the vehicle 102, in accordance with an embodiment of the present invention. At step 210, the data acquisition interface 1042 receives data corresponding to the vehicle 102, the data being received for the plurality of attributes. Further, the data is transmitted to the control unit 1044. At step 220, the control unit 1044 determines the one or more of a previous, a current and a future state of the vehicle 102 from the data. At step 230, the projector unit 1046 displays the one or more of the previous, the current and the future state of the vehicle 102, in form of a hologram 1050 projected through the exterior of the vehicle 102. In several embodiments, the microphone 1048 receives the voice input, the control unit 1044 converts the voice input into the text output and delivers the text output to the mobile handheld device 112 through the communication network 110. In several embodiments, the microphone 1048 receives the custom message and the projector unit 1046 includes the custom message in the hologram 1050. In one embodiment of the invention, the projector unit 1046 further includes the one or more advertisements in the hologram 1050. In one embodiment of the invention, the projector unit 1046 further includes the one or more ornamental patterns in the hologram 1050.

The present invention as describes above offers a number of advantages. It promotes safe driving, allows greater response time, aids in reducing traffic congestions. Further, more information means greater speeds can be maintained without compromising safety, thereby saving transit time.

The features can be implemented in a computer system that includes a back-end component, such as a data server or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a LAN, a WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some embodiments, an API call can report to an application the capabilities of a device running the application, such as input capability, output capability, processing capability, power capability, communications capability, etc.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publicly accessible network such as the Internet.

It should also be understood that, unless specifically stated otherwise as apparent from the following discussion, it is appreciated that throughout the description, discussions utilizing terms such as "controlling" or "obtaining" or "computing" or "storing" or "receiving" or "determining" or the like, refer to the action and processes of a computer system, or similar electronic computing device, that processes and transforms data represented as physical (electronic) quantities within the computer system's registers and memories into other data similarly represented as physical quantities within the computer—system memories or registers or other such information storage, transmission or display devices.

It should be noted that where the terms "server", "secure server" or similar terms are used herein, a communication device is described that may be used in a communication system, unless the context otherwise requires, and should not be construed to limit the present invention to any particular communication device type. Thus, a communication device may include, without limitation, a bridge, router, bridge-router (router), switch, node, or other communication device, which may or may not be secure.

It should also be noted that where a flowchart is used herein to demonstrate various aspects of the invention, it should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often, logic elements may be added, modified, omitted, performed in a different order, or implemented using different logic constructs (e.g., logic gates, looping primitives, conditional logic, and other logic constructs) without changing the overall results or otherwise departing from the true scope of the invention.

A number of embodiments have been described. Nevertheless, it will be understood that various modifications may be made. Elements of one or more embodiments may be combined, deleted, modified, or supplemented to form further embodiments. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. A vehicle information device to be installed into a vehicle having a driver side, a passenger side, a front end, and a rear end, the vehicle information device comprising:
   a data acquisition interface, configured to receive data corresponding to the vehicle, the data being received for a plurality of attributes;
   a control unit configured to receive the data from the data acquisition interface and determine one or more of a previous, a current and a future state of the vehicle from the data, wherein the control unit is further configured to determine the future state from current traffic data and historical data including previous driver behavior;
   a projector unit configured to display an image indicating one or more of the previous, the current and the future state of the vehicle, in the form of a hologram projected into a space above the top of the vehicle and between the driver side, the passenger side, the front end, and the rear end of the vehicle, the image being visible in the space above the top of the vehicle to others located outside the vehicle; and
   a plurality of battery packs rechargeable through solar panels;
   wherein the data, received by the data acquisition interface, corresponds to determinations performed over a predetermined period of time, in order to save power, the data corresponding to the determinations performed over the predetermined period of time being one or more of data previously stored and data sampled intermittently.

2. The vehicle information device as claimed in claim 1, wherein the plurality of attributes includes a location, a speed, a direction and a destination of the vehicle, wherein the destination is a predictive destination and the control unit is configured to determine the destination based on previous trips taken by the vehicle in the past.

3. The vehicle information device as claimed in claim 1, wherein the data acquisition interface is configured to receive the location and the destination of the vehicle from a GPS device installed with the vehicle.

4. The vehicle information device as claimed in claim 1, wherein the data acquisition interface is configured to receive the data from one or more sensing devices installed with the vehicle.

5. The vehicle information device as claimed in claim 1, wherein the data corresponds to determinations performed in real-time.

6. The vehicle information device as claimed in claim 1, wherein the hologram is a 7-Dimensional hologram.

7. The vehicle information device as claimed in claim 1, further comprising a microphone configured to receive a voice input, the control unit being configured to convert the voice input into a text output and deliver the text output to a mobile handheld device through a communication network.

8. The vehicle information device as claimed in claim 1, further comprising a microphone configured to receive a custom message, the projector unit being configured to include the custom message in the hologram.

9. The vehicle information device as claimed in claim 1, wherein the projector unit is further configured to include one or more advertisements and/or one or more ornamental patterns, in the hologram.

10. A method of providing information pertaining to a vehicle having a driver side, a passenger side, a front end, and a rear end, the method comprising steps of:
    receiving data corresponding to the vehicle, the data being received for a plurality of attributes;
    determining one or more of a previous, a current and a future state of the vehicle from the data, wherein the future state is determined from current traffic data and historical data including previous driver behavior; and
    displaying an image indicating one or more of the previous, the current and the future state of the vehicle, in form of a hologram projected into a space above the top of the vehicle and between the driver side, the passenger side, the front end, and the rear end of the vehicle, the image being visible in the space above the top of the vehicle by others located outside the vehicle;
    wherein the data corresponds to determinations performed over a predetermined period of time, in order to save power, the data corresponding to the determinations performed over the predetermined period of time being one or more of data previously stored and data sampled intermittently.

11. The method as claimed in claim 10, wherein the plurality of attributes includes a location, a speed, a direction and a destination of the vehicle wherein the destination is a predictive destination determined based on previous trips taken by the vehicle in the past.

12. The method as claimed in claim 10, wherein the location and the destination of the vehicle are received from a GPS device installed with the vehicle.

13. The method as claimed in claim 10, wherein the data is received from one or more sensing devices installed with the vehicle.

14. The method as claimed in claim 10, wherein the data corresponds to determinations performed in real-time.

15. The method as claimed in claim 10, wherein the hologram is a 7-Dimensional hologram.

16. The method as claimed in claim 10, further steps of receiving a voice input, converting the voice input into a text output and delivering the text output to a mobile handheld device through a communication network.

17. The method as claimed in claim 10, further comprising steps of receiving a custom message and including the custom message in the hologram.

18. The method as claimed in claim 10, further comprising a step of including one or more advertisements and/or one or more ornamental patterns, in the hologram.

* * * * *